United States Patent [19]
Reimert

[11] 4,094,539
[45] June 13, 1978

[54] RIGID CONNECTOR AND PILING
[75] Inventor: Larry E. Reimert, Camarillo, Calif.
[73] Assignee: Vetco, Inc., Ventura, Calif.
[21] Appl. No.: 854,356
[22] Filed: Nov. 23, 1977

Related U.S. Application Data
[63] Continuation of Ser. No. 712,491, Aug. 9, 1976, abandoned.

[51] Int. Cl.² ............................................. F16L 21/00
[52] U.S. Cl. .................................... 285/309; 285/403
[58] Field of Search ................ 285/404, 403, 18, 309, 285/308, 319; 61/53; 166/242

[56] References Cited
U.S. PATENT DOCUMENTS

| | | | |
|---|---|---|---|
| 3,155,401 | 11/1964 | Musolf | 285/309 X |
| 3,472,538 | 10/1969 | Vincent et al. | 285/403 X |
| 3,585,803 | 6/1971 | Bardgette | 285/308 X |
| 3,606,393 | 9/1971 | Huntsinger et al. | 285/308 X |
| 3,827,728 | 8/1974 | Hynes | 285/309 X |

FOREIGN PATENT DOCUMENTS 698,345  11/1965  Italy ...................................... 285/403

Primary Examiner—Thomas F. Callaghan
Attorney, Agent, or Firm—Subkow and Kriegel

[57] ABSTRACT

A connector for securing adjacent pile sections, or other pipe sections, to each other, including a box disposed over a pin, with the end of the box engaging a companion pin shoulder, the pin and box being rigidly secured together by a plurality of lock dogs forced radially within companion grooves in the pin, the dogs and grooves having coengaging cam surfaces exerting an axial thrust between the box end and pin shoulder upon inward movement of the dogs, to provide a large bearing area and preload between the pin and box under substantial compression to prevent separation between the pin and box due to rebound during the pile driving operation.

3 Claims, 3 Drawing Figures

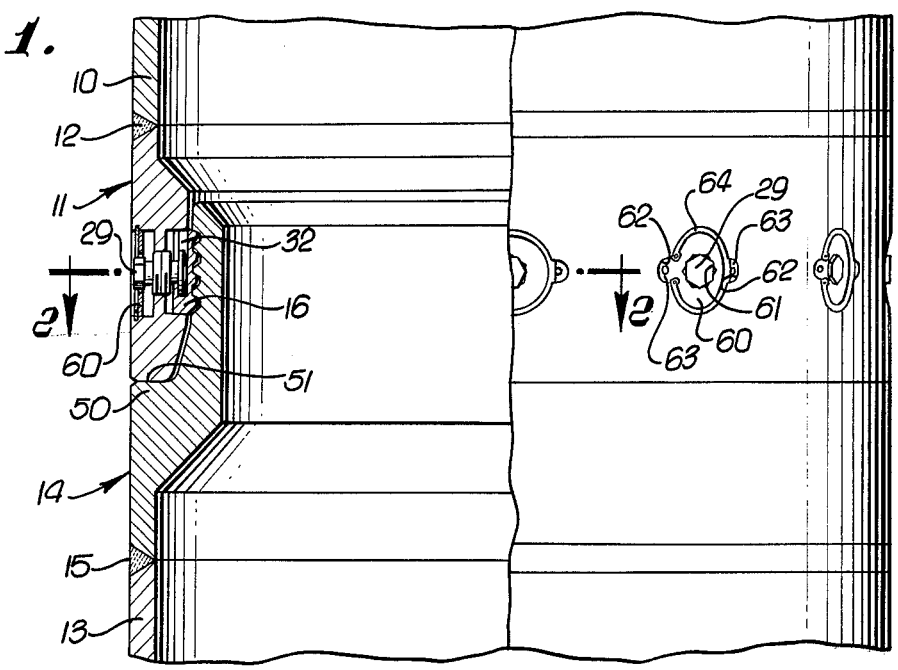
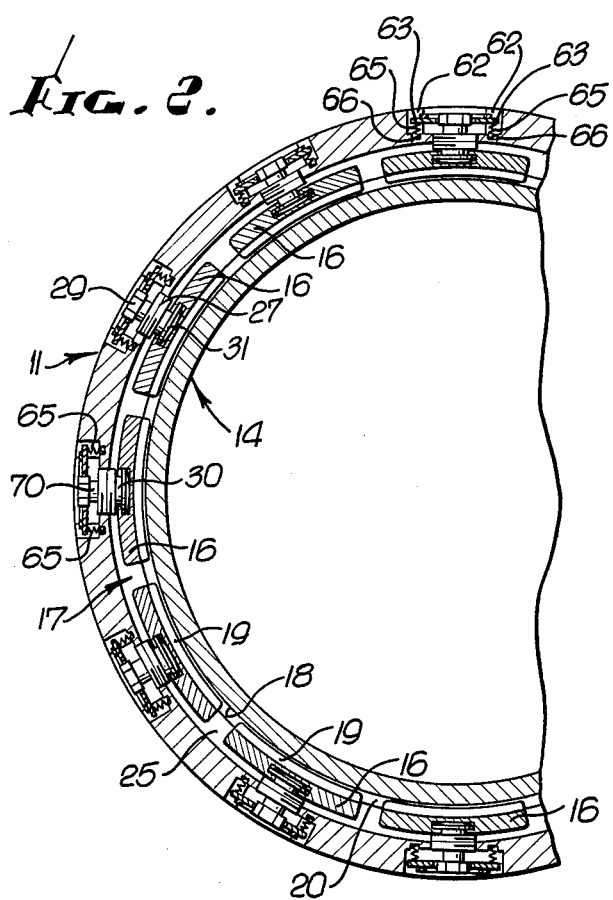
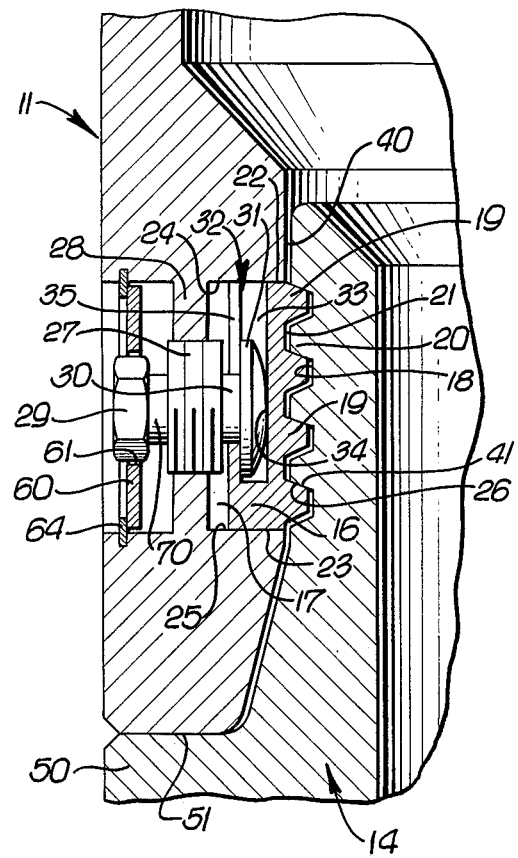

RIGID CONNECTOR AND PILING

This application is a continuation of application Ser. No. 712,491, filed Aug. 9, 1976, for "Rigid Connector and Piling", and now abandoned.

The present invention relates to connectors for securing pipe sections together, and more particularly to pin and box connectors useful in driven pile strings.

Pin and box connectors have been used for securing pipe sections to each other. Each pin and box has been secured together by welding, which is time consuming and costly, particularly when the pipe sections are of large diameter and are used as piling driven into the ocean floor. Mechanical connectors between the pipe sections have also been proposed, but their components are difficult to secure to one another. Additionally, they do not provide a rigid connection between adjacent pipe sections. The lack of rigidity tends to produce separation between the connector parts due to rebounding resulting from each impact of the pile driver against the pipe.

The present invention contemplates a connector capable of rigidly securing pipe sections to each other in a relatively fascile manner. The rigid attachment between the sections is obtained by coengaging the pin and box of each connector and placing their coengaging bearing areas in substantial compression to preload the pin and box and prevent separation between them under pile driving conditions. If the pipe string is being used for other purposes than as piling, then the preload compressive force exerted between the pin and box will prevent loosening of the parts in the event the pipe string is subject to tension or to bending forces.

The pin and box forming the terminal portions of adjacent pipe sections are preferably externally flush to facilitate the pile driving of the pipe sections into an earth formation. There is still adequate room and bearing area to effect the preload between the pin and box.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings:

FIG. 1 is a longitudinal section, a portion being disclosed in side elevation, of a connector embodying the invention for securing adjacent pipe sections to each other;

FIG. 2 is a partial cross-section taken along the line 2—2 on FIG. 1;

FIG. 3 is an enlarged vertical section through a portion of the connector illustrated in FIG. 1.

As disclosed in the drawings, an upper pipe section 10 has a lower box portion 11 secured to it, as by a circumferentially continuous weld 12. A lower pipe section 13 has a pin 14 secured thereto by a circumferentially continuous weld 15. The external surfaces of the pin and box are flush with respect to one another, and also with respect to the upper and lower pipe sections, to eliminate outwardly extending protuberances that might interfere with the driving of a piling into the formation, such as a formation underlying a body of water.

The pin and box are secured together against relative longitudinal movement by a plurality of circumferentially spaced horizontally movable lock members or dogs 16 disposed in openings or windows 17 in the box 11 and adapted to be shifted inwardly into one or more circumferentially continuous grooves 18 in the pin 14. Each dog is of substantial arcuate extent, having one or more inwardly directed rib portions or teeth 19 adapted to move within the external grooves 18 of the pin. The intervening portion or teeth 20 on the pin are adapted to be received within grooves 21 formed between the lock dog ribs or teeth 19. The dogs 16 are circumferentially spaced from one another, being of a suitable number, depending upon the diameter of the pipe sections and of the pin and box secured thereto. The greater the diameter the greater the number of dogs spaced around the box and pin. Each dog has top and bottom parallel surfaces 22, 23 adapted to move radially within its window 17 and along the companion top and bottom surfaces 24, 25 of the window.

Each dog 16 is adapted to occupy a completely retracted or outward position, in which its teeth or ribs 19 are disposed entirely within the confines of the window 17. The dog can be shifted radially inwardly to cause its ribs to move into the pin grooves 18, and into engagement with the upper sides 26 of the grooves. Such inward and also outward movement of each dog is secured by providing a screw 27 threaded into an intermediate partition 28 of the window, this screw having an outer head 29 to which a suitable wrench (not shown) can be applied for rotating the screw in both directions, and also possessing a smaller diameter shank 30 terminating in an inner thrust head 31.

The shank 30 can be moved downwardly within a T-shaped slot 32 in the outer portion of each lock dog when the screw is being assembled to the latter, the large diameter thrust head 31 moving downwardly within a wider part 33 of the slot with its outer margins received within the outer portions of the wider slot. The thrust head 31 of the screw is adapted to bear inwardly against the base 34 of the larger slot, the outer margins of the head being adapted to engage the opposed outer rib portions 35 of the dog, through which the reduced diameter shank 30 extends for the purpose of shifting the dog outwardly, in the event the pin and box are to be released from one another.

In assembling each screw 27 and dog 16 in the apparatus prior to insertion of the pin 14 into the box 11, the inner shank 30 and head 31 of each screw are moved downwardly into the slot 32, which opens through the top of the dog, and the screw is then inserted from the interior of the box through its window 17, the screw then being turned in the appropriate direction, as to the left, to thread a screw portion within a companion threaded bore in the partition 28, the outward threading being continued until the lock dog 16 moves completely inwardly of the inner wall 40 of the box. After all of the lock dogs and screws have been assembled within the box, and shifted to their extreme outward positions, the box 11 can then be disposed over the pin. Each screw 27 is then rotated in the appropriate direction, as to the right, to force the lock dogs teeth 19 into the pin grooves 18. It is to be noted that the inner portions of each dog are curved to conform to the curvature of the pin 14 to provide a greater contacting area between the dog ribs or teeth 19 and the upper sides 26 of the pin grooves.

The upper sides 41 of the ribs and the upper sides 26 of the grooves are disposed at an angle y to a plane normal to a common axis of the pin and box, such that rotation of the screws 27 to force the lock members 16 inwardly will shift the pin 14 relatively in an upward direction within the box 11. Rotation and actuation of the screws will cause the heads 31 to bear against the lock dogs and shift their tapered surfaces 41 against the tapered surfaces 26 on the pin, until a shoulder 50 on the pin bears against the lower end 51 of the box. Continued application of torque to the screws will tend to force the pin 14 further inwardly within the box 11 and will compress the shoulder 50 to a further extent against the lower end 51 of the box, applying a preload to the connector. The screws are further tightened until the desired compression or preload exists between the pin shoulder 50 and the lower end 51 of the box. Such compressive force can be very large, since the area over which the force is transmitted is circumferentially continuous around the pin shoulder 50 and box end 51.

The connector illustrated and described effects a metal-to-metal seal between the pin and box providing a tight rigid joint therebetween. The stored energy in the pin and box enables the connector to be subjected to high impact forces, such as occurs when the pipe string is being used for pile driving purposes, and substantial rebound effects, which might tend to separate the shoulder 50 and box end 51 from one another. The preload compression imposed upon the pin and box members is greater than the rebound effect, or of any tensile or bending load that might be imposed upon the pipe string, thereby preventing separation of the pin shoulder and box end from one another.

Each screw 27 may be locked in the position to which it has been turned to prevent vibration, or other forces, from tending to back off the acutating screw, and thereby loosen its associated lock dog. A lock plate 60 is located in an outer portion of the window on the external side of the partition 28 and is reciprocable with respect to the actuator screw, having a non-circular or hexagonal opening 61 conforming to and adapted to receive the head 29 of the actuator screw when the lock plate is in its normal position. The box 11 has radial slots 62 adjacent to the outer portion of the window receiving ears 63 of the lock plate to permit axial, but non-rotative movement of the plate 60 in the box. A split retainer ring 64 is disposed in the window and fixed to the body to limit outward movement of the lock plate 60 to a location in which the actuator screw head 29 is disposed in the complemental opening 61 of the plate. A pair of compression springs 65 extend between the ears 63 of each lock plate and sockets 66 in the box normally biasing the lock plate to its outer position, in which the screw head 29 is disposed in the non-circular plate opening to prevent rotation of the actuator screw. However, the application of a wrench to the screw head 29 will cause the wrench to inwardly displace the lock plate to a location in which it is disposed about a reduced diameter circular portion 70 of the actuator screw, permitting the screw to be rotated by the wrench in either direction. When the wrench is removed from the screw head, the lock plate 60 is biased automatically by the springs to a screw locking position.

A relatively simple, easily connectable, and preferably externally flush pipe connector has been provided to which a pre-load can be applied between the pin and box for the purpose of preventing separation between their confronting surfaces 50, 51, maintaining their coengaging parts under compression at all times. The preload can be quite extensive, particularly since the compressive load is transmitted over a large and full circumferential area between the coengaging pin shoulder 50 and box end 51. A rigid connector is provided which will not loosen under repeated impact blows from the pile driver, and which is capable of easy assembly in a rapid manner, thereby effecting substantial savings in cost of operation.

I claim:

1. A rigid pipe connector comprising a metallic tubular pin having an external transverse shoulder and a plurality of axially spaced outer peripheral grooves, sides of said groove providing a plurality of axially spaced tapered surfaces, a metallic tubular box telescopically disposed over said pin and having a transverse end engaging said shoulder, circumferentially spaced lock members slidable radially in said box into said grooves, said lock members having tapered surfaces axially spaced from each other and simultaneously engaging said axially spaced tapered groove surfaces, means for shifting said lock members radially inwardly of said grooves to force the tapered surfaces of said lock members against said pin tapered surfaces and shift said pin axially of said box to force said shoulder against said box end and apply compressive preload to said box end and pin shoulder, the other sides of said groove axially spaced from said lock members to enable said compressive preload to be effected, the periphery of said pin within said box and the inner surface of said box confronting said periphery being shaped in such manner as to be free from axial force transmitting relation to each other so that the full preloading force produced by coengagement between said lock member tapered surfaces and pin tapered surfaces is transmitted to said pin shoulder and transverse box end contacting such shoulder.

2. A connector as defined in claim 1, said shifting means comprising screws threaded in said box and engaging said lock members to force said lock members radially inwardly upon turning of said screws in one direction.

3. A connector as defined in claim 1, said pin and box having the same external diameter to provide an externally flush connector and said shifting means being located entirely within the confines of the wall of said box.

* * * * *